(12) United States Patent
Hofman

(10) Patent No.: US 12,496,597 B2
(45) Date of Patent: Dec. 16, 2025

(54) SHOWERHEAD WITH ADAPTER ASSEMBLY

(71) Applicant: ETL, LLC, Reno, NV (US)

(72) Inventor: David Hofman, Reno, NV (US)

(73) Assignee: ETL, LLC, Reno, NV (US)

( * ) Notice: Subject to any disclaimer, the term of this patent is extended or adjusted under 35 U.S.C. 154(b) by 268 days.

(21) Appl. No.: 18/205,923

(22) Filed: Jun. 5, 2023

(65) Prior Publication Data
US 2024/0399393 A1     Dec. 5, 2024

(51) Int. Cl.
*B05B 1/18*     (2006.01)
*E03C 1/06*     (2006.01)

(52) U.S. Cl.
CPC .............. *B05B 1/185* (2013.01); *E03C 1/06* (2013.01)

(58) Field of Classification Search
CPC .......... B05B 1/185; B05B 1/18; B05B 15/62; E03C 1/06; E03C 2001/0415; E03C 1/0408; E03C 1/0409
USPC ................................................ 4/661; 16/221
See application file for complete search history.

(56) References Cited

U.S. PATENT DOCUMENTS

| | | | | |
|---|---|---|---|---|
| 2,867,230 A | * | 1/1959 | Bletcher | F16K 19/00 239/443 |
| 3,722,799 A | * | 3/1973 | Rauh | B05B 1/1618 239/443 |
| 4,287,618 A | * | 9/1981 | Silver | A47K 3/022 4/444 |
| 5,294,054 A | * | 3/1994 | Benedict | B05B 1/3006 239/383 |
| 5,823,441 A | * | 10/1998 | Nicholson | E03C 1/0408 239/447 |
| 6,315,220 B1 | * | 11/2001 | Grubb | F16L 37/48 4/615 |
| 6,446,278 B1 | | 9/2002 | Lin | |
| 6,813,787 B2 | * | 11/2004 | Rosenberg | A47K 3/28 4/612 |
| 8,205,846 B2 | | 6/2012 | Glunk | |
| 8,511,927 B2 | * | 8/2013 | Houman | A47K 7/046 401/289 |
| 8,702,018 B1 | * | 4/2014 | Rivera | E03C 1/046 239/311 |
| 9,464,416 B1 | * | 10/2016 | Breda | E03C 1/0408 |
| 9,919,331 B2 | | 3/2018 | Scheffer et al. | |

(Continued)

FOREIGN PATENT DOCUMENTS

| | | | | |
|---|---|---|---|---|
| CA | 3087665 A1 | * | 1/2021 | ............... A47K 3/28 |
| CN | 108368696 B | * | 5/2021 | ........... B01D 35/046 |

(Continued)

*Primary Examiner* — Lori L Baker
(74) *Attorney, Agent, or Firm* — ONE LLP

(57) ABSTRACT

A showerhead assembly includes an adapter assembly for operatively engaging and disengaging a handheld showerhead from a pipe of a water source. The adapter assembly includes an adapter and a diverter. The adapter includes an attachment mechanism for coupling to the diverter, and the diverter includes a complementary attachment mechanism for coupling to the adapter. The attachment mechanisms which couple the diverter to the adapter can include magnets, a hook and loop mechanism, or a ball joint connection, to name a few. In addition, a spring-button tab mechanism can be utilized for managing the engagement and disengagement of the adapter with the diverter.

17 Claims, 12 Drawing Sheets

(56) References Cited

U.S. PATENT DOCUMENTS

| | | | |
|---|---|---|---|
| 10,568,466 B2* | 2/2020 | Hawkins | A47B 3/28 |
| 10,695,786 B2 | 6/2020 | Mercado | |
| 11,198,991 B1* | 12/2021 | Backus | E03C 1/066 |
| 2004/0133973 A1* | 7/2004 | Rosenberg | A47K 3/28 4/601 |
| 2004/0256303 A1* | 12/2004 | Talbot | B01D 35/04 210/232 |
| 2005/0127211 A1* | 6/2005 | Yeiser | B05B 15/628 239/436 |
| 2007/0194153 A1* | 8/2007 | Frazee | B05B 15/50 239/428.5 |
| 2009/0000022 A1* | 1/2009 | Phipps | E03C 1/0408 4/601 |
| 2012/0151669 A1* | 6/2012 | Wilson | F16K 11/085 4/615 |
| 2014/0259383 A1* | 9/2014 | Harris | E03C 1/0401 4/678 |
| 2015/0143625 A1* | 5/2015 | Veurink | A47K 3/281 4/448 |
| 2017/0050197 A1* | 2/2017 | Huffington | B05B 9/01 |
| 2017/0157634 A1* | 6/2017 | Johnson | B05B 1/1645 |
| 2019/0093324 A1* | 3/2019 | Backus | E03C 1/05 |
| 2019/0211537 A1* | 7/2019 | Lee | E03C 1/021 |
| 2019/0365160 A1* | 12/2019 | Hawkins | B05B 1/16 |
| 2020/0108404 A1* | 4/2020 | Hatton | E03C 1/0408 |
| 2020/0146512 A1* | 5/2020 | Hawkins | A47K 3/28 |
| 2020/0263399 A1* | 8/2020 | Sierks | B05B 12/0024 |
| 2021/0016301 A1* | 1/2021 | Cipriani | B05B 1/185 |
| 2021/0178408 A1* | 6/2021 | Hofman | B05B 1/1663 |
| 2021/0178409 A1* | 6/2021 | Hofman | E03C 1/0408 |
| 2021/0187520 A1* | 6/2021 | Hofman | B05B 1/3415 |
| 2021/0214926 A1* | 7/2021 | Backus | A61C 17/032 |
| 2021/0353111 A1* | 11/2021 | Hofman | A47K 5/1202 |
| 2022/0025621 A1* | 1/2022 | Backus | A61C 17/0202 |
| 2022/0048048 A1* | 2/2022 | Hofman | B05B 1/06 |
| 2022/0105526 A1* | 4/2022 | Hofman | B05B 3/04 |
| 2022/0126310 A1 | 4/2022 | Dai et al. | |
| 2022/0170253 A1* | 6/2022 | Veurink | E03C 1/0409 |
| 2022/0176391 A1* | 6/2022 | Hofman | B05B 1/185 |
| 2022/0298766 A1* | 9/2022 | Hofman | F16L 27/04 |
| 2022/0314245 A1* | 10/2022 | Hofman | B05B 1/185 |
| 2022/0331821 A1* | 10/2022 | Hofman | B05B 1/1645 |
| 2022/0341135 A1* | 10/2022 | Hofman | E03C 1/0408 |
| 2023/0201857 A1* | 6/2023 | Hofman | B05B 15/62 239/283 |
| 2023/0383509 A1* | 11/2023 | Wilson | E03C 1/025 |
| 2024/0025765 A1* | 1/2024 | Carosi | E03C 1/0408 |
| 2024/0181472 A1* | 6/2024 | Hofman | B05B 1/3405 |
| 2024/0181475 A1* | 6/2024 | Hofman | B05B 1/185 |
| 2024/0189840 A1* | 6/2024 | Hofman | B05B 1/1636 |
| 2024/0286152 A1* | 8/2024 | Hofman | B05B 1/18 |
| 2025/0043552 A1* | 2/2025 | Hofman | E03C 1/046 |
| 2025/0129585 A1* | 4/2025 | Hofman | B05B 1/16 |

FOREIGN PATENT DOCUMENTS

| | | | | |
|---|---|---|---|---|
| CN | 112934494 A | | 6/2021 | |
| CN | 113616096 A | * | 11/2021 | A47K 3/28 |
| CN | 115053039 A | * | 9/2022 | B05B 1/18 |
| CN | 115055293 A | | 9/2022 | |
| CN | 218204730 U | | 1/2023 | |
| CN | 218452289 U | | 2/2023 | |
| FR | 3013366 A1 | | 5/2015 | |
| GB | 2348615 A | * | 10/2000 | A47K 3/28 |
| GB | 2480291 A | * | 11/2011 | E03C 1/023 |
| WO | WO-2012050894 A1 | * | 4/2012 | A47K 3/28 |
| WO | WO-2012142578 A2 | * | 10/2012 | E03C 1/023 |

\* cited by examiner

SHOWERHEAD WITH ADAPTER ASSEMBLY

BACKGROUND OF THE INVENTION

The present invention relates to showerheads. More particularly, the present invention relates to adapters that can be used with handheld showerheads.

Showerheads are commercially available in numerous designs and configurations for use in showers, faucets, spas, sprinklers and other personal and industrial systems. The vast majority of showerheads include spray heads which may be categorized as being either stationary or oscillating and have either fixed or adjustable openings. Stationary spray heads with fixed jets are the simplest constructions consisting essentially of a central channel connected to one or more spray nozzles directed to produce a constant pattern. Multi-function spray heads are able to deliver water in different spray patterns such as a fine spray, a coarse spray, a pulsating spray, or even a flood pattern producing a high fluid flow.

A handheld showerhead assembly typically includes a hollow handle connected to a water supply by a flexible rubber hose. The handle has a proximal end which typically has a threaded inlet for connecting to the rubber hose. Meanwhile, at the handle's distal end, the showerhead assembly includes a showerhead including a plurality of nozzles for ejecting water. Typically, the handle and showerhead face are angled relative to one another so that water is ejected at approximately 90 degrees relative to the handle's longitudinal axis.

Advantageously, the showerhead handle allows users to manipulate the spray nozzles into various positions and alignment to assist in the cleaning process. Unfortunately, though handheld showerheads provide many advantages compared to their fixed showerhead counterpart, handheld showerheads suffer from several disadvantages. For example, Chinese Publication No. 218204730 describes handheld showerhead assemblies that utilize a magnetic docking mechanism. Further, U.S. Patent Publication No. 2022/0126310 and Chinese Patent Publication No. 112934494 describe handheld showerheads which include a magnetic coupler so as to affix the showerhead in an aligned condition. In these embodiments, the magnet retention mechanism may be unsecure, causing the handheld showerhead to inadvertently release from its desired attached position. Moreover, none of these embodiments disclose a handheld assembly that utilizes an adapter that can removably attach to a proximal end of the handheld showerhead.

Thus, it would be advantageous to provide a showerhead assembly comprising an adapter that can removably attach to a handheld showerhead's proximal end so as to operatively engage and/or disengage it from a pipe fixture. It would be further advantageous to utilize a firm fastener with the adapter, which would allow the user to manipulate or change the angle of the handheld showerhead while keeping the handle of the handheld showerhead in an upright manner. In this regard, accidental rotation of the handheld showerhead could be avoided.

Traditionally, handheld showerheads attach to the diverter by including a receptacle that holds the handle portion of the handheld showerhead. This places the handheld showerhead in an elevated position which users find desirable. Unfortunately, more recently introduced magnetic couplers attach the diverter to the showerhead portion of the handheld showerhead. This places the handheld showerhead in a lowered position that many users find undesirable. Thus, it would be further advantageous to provide a showerhead assembly with a handheld showerhead that magnetically connects to an adapter which positions the handheld showerhead in the more desirable elevated position. It would also be desirable for the connection to include a ball and socket mechanism such that the user can manipulate the positioning of the handheld showerhead while providing for a secure docking mechanism.

SUMMARY OF THE INVENTION

The present invention addresses the aforementioned disadvantages by providing an improved showerhead assembly which includes an adapter assembly for supporting a handheld showerhead. The adapter assembly includes an adapter and a diverter. The showerhead assembly includes a handheld showerhead having a plurality of nozzles for expelling water such as within a shower.

The handheld showerhead further includes a hollow handle with a proximal end which preferably is threaded for connecting to the adapter. The handle is elongate so as to define a longitudinal axis, and preferably, the distal end of the handle affixes to the showerhead at an angle, such as 45° to 90°. Additionally, the handheld showerhead includes a channel having an inlet for receiving water for being expelled from the showerhead nozzles. Various channel, conduit and nozzle constructions can be determined by those skilled in the art for diverting water from the inlet to the showerhead's nozzles.

Preferably, the adapter comprises a housing with an inlet, an outlet, a front end, and a back end. More preferably, the adapter comprises a passageway which extends from the inlet to the outlet. Even more preferably, the inlet is coupled to and in fluid communication with a flexible hose, which is in fluid communication with the diverter that connects to a pipe of a water source. Further, the outlet is coupled to and in fluid communication with the handheld showerhead by way of the hollow handle's proximal end. In this manner, water is transported from the water source to the handheld showerhead for expellation from the nozzles thereon.

Moreover, the diverter is further configured for releasably holding the adapter. The diverter comprises a pipe end configured to connect to the pipe of the water source, a hose end configured to connect with the flexible hose, and a connection end comprising a coupling structure with a connection point which releasably couples with a portion of the adapter. Specifically, the coupling structure has a distal portion comprising the connection point axially extending therefrom. More specifically, the back end of the adapter housing comprises a cavity sized and configured to be complementary to the connection point. Even more specifically, the coupling structure is connected to the connection end of the diverter by a ball and socket attachment so as to allow the adapter coupled with the handheld showerhead to rotate or move along a central axis of the connection end, and as desired by a user.

In some embodiments, the distal portion of the coupling structure includes an adapter engagement surface. In some embodiments, the adapter engagement surface defines the connection point. Preferably, the adapter engagement surface includes flat sides. More preferably, the adapter engagement surface is sized and configured to correspond to a shape of the cavity, which comprises a diverter engagement surface. Even more preferably, the cavity is a substantially spherical cavity. A "substantially spherical cavity" is defined as having a substantial portion of its surface as having a spherical or curved shape. However, "substantially spherical cavity" is intended to be interpreted broadly such that the entire cavity need not have concave surface. For example, the substantially spherical cavity may include a portion of the surface that is planar such as to form a frusto-spherical shape. In preferred embodiments, the cavity comprises curved top and bottom edges, and flat edges. In this regard, the flat edges are configured to be complementary to the flat sides of the adapter engagement surface. The flat geometry of the adapter engagement surface and the cavity provides for improved fastening means between the diverter and adapter coupled with the handheld showerhead. Specifically, the handheld showerhead coupled to the adapter is prevented from inadvertently rotating. Further, the handheld showerhead coupled to the adapter is able to be kept in an upright position.

Moreover, in some embodiments, the coupling structure further includes an alignment surface axially extending therefrom. In some preferred embodiments, the alignment surface has a smaller surface area than the adapter engagement surface. Further, the alignment surface can include an outer perimeter that is complementary to a largest perimeter of the cavity so as to be received thereby and further secure the connection between the adapter and the coupling structure of the diverter.

In preferred embodiments, the coupling structure further includes an attachment means or fastener. Preferably, the cavity includes a corresponding attachment means that couples with the fastener of the coupling structure. In some preferred embodiments, the coupling structure includes a connector magnet and the cavity includes an adapter magnet. In these embodiments, the adapter is securely coupled to the coupling structure of the diverter by attraction of the connector magnet and the adapter magnet. In some embodiments, the connector magnet is a magnetic disk disposed on the adapter engagement surface and defining the connection point. In some embodiments, the adapter magnet is a complementary magnetic disk protruding from a planar diverter engagement surface within the cavity.

In other preferred embodiments, the coupling structure can include a ball extending therefrom which comprises the adapter engagement surface and defines the connection point that interfaces with the cavity of the adapter. In these embodiments, the cavity includes a planar surface and a tension pin which axially protrudes from the cavity's planar surface. The tension pin is sized and configured to engage with the coupling structure's ball when the ball is positioned within the adapter's cavity. In some embodiments, the ball has a distal end that can comprise a preliminary alignment chamber which houses a locking chamber axially aligned therein. Specifically, the tension pin engages with the ball's locking chamber so as to prevent over-rotation of the ball joint or inadvertent release of the adapter. Additionally, the tension pin engages with the ball's preliminary alignment chamber to further stabilize and secure the connection realized between the adapter and coupling structure of the diverter. Additional or alternative ball joint assemblies for providing these capabilities can be selected by those skilled in the art.

In yet other preferred embodiments, the adapter assembly can include a hook and loop coupling mechanism to releasably affix the adapter to the coupling structure of the diverter. In these embodiments, the coupling structure can include a hook portion, and the cavity can include the corresponding loop portion, or vice versa. In some embodiments, the hook or loop portions can be disposed on the adapter engagement surface on the coupling structure and define the connection point.

Further, in some preferred embodiments, the adapter assembly can include an adhesive coupling mechanism, such as Velcro, that can be utilized to releasably affix the adapter to the coupling structure of the diverter.

In some preferred embodiments, the adapter assembly includes a spring-loaded button and tab mechanism. Specifically, the adapter can be securely connected to the coupling structure of the diverter by a function of the spring-loaded button and tab mechanism. Preferably, the button extends from the adapter, e.g., its front end. More preferably, the button is coupled with and fits on the tab, which is connected to a body of the cavity.

In preferred embodiments, the body of the cavity comprises an upper body portion having a first spring and a lower body portion having a second spring, wherein the upper body portion and lower body portion are configured to transition between a contracted position and an expanded position in response to movement of the tab. Preferably, the tab is configured to pivotally move in an inward and outward trajectory relative to the body. More preferably, as a force is exerted on the button, the tab is configured to move in an inward direction towards the body. As a result, the first spring and second spring compress, thereby causing the upper body portion and lower body portion to move to the expanded position. In the expanded position, the upper body portion is moved in an upward position and the lower body portion is moved in a downward position. In other words, the upper body portion and lower body portion both move in a direction away from a central axis of the body.

Additionally, and upon release of the button or a force opposite to that which caused the tab to move in an inward direction, the tab is configured to pivot in an outward direction. In this manner, the first spring and second spring decompress, and the upper body portion and lower body portion move to the contracted position. As such, the upper body portion moves in a downward direction and the lower body portion moves in an upward position. In other words, the upper body portion and lower body portion both move towards the central axis of the body.

In preferred embodiments, an upper clasp and lower clasp protrude from the cavity when the upper body portion and lower body portion are in the contracted position. In this manner, the clasps grip the coupling structure's connection point and secure the connection realized between the coupling structure and adapter. Further, in the expanded position, the upper clasp and lower clasp are disposed entirely within the housing and configured such that they are not protruding from the cavity. As a result, the adapter can be released from the coupling structure so as to allow the adapter to be disengaged from the diverter.

In some embodiments, the tab is configured to pivotally move in an upward and downward trajectory and is situated directly adjacent to and underneath the cavity. Additionally, a spring is disposed within the housing of the adapter and compresses and decompresses as a function of the button and tab. Specifically, when the button is pressed, the spring is decompressed and the tab extends upwardly so as to protrude into the cavity area and secure the connection point (e.g., the ball) within the cavity. Conversely, when the button is depressed, the spring compresses and the tab pivots downwardly. In some embodiments, the tab is positioned and configured so that when it pivots downwardly, it is no longer protruding into the cavity so as to provide an engagement point which allows the connection point to release from within the cavity. Various spring-loaded button and tab constructions for providing these capabilities can be selected by those skilled in the art.

Advantageously, the showerhead assembly provides for an adapter assembly which allows for secure retention of the handheld showerhead onto a coupling structure of a diverter.

Also advantageously, the showerhead assembly allows the bather to controllably rotate the handheld showerhead so as to divert the water stream in a desired location within the shower environment.

Other features and advantages of the present invention will be appreciated by those skilled in the art upon reading the detailed description which follows with reference to the drawings.

DETAILED DESCRIPTION OF THE INVENTION

Figure 1:
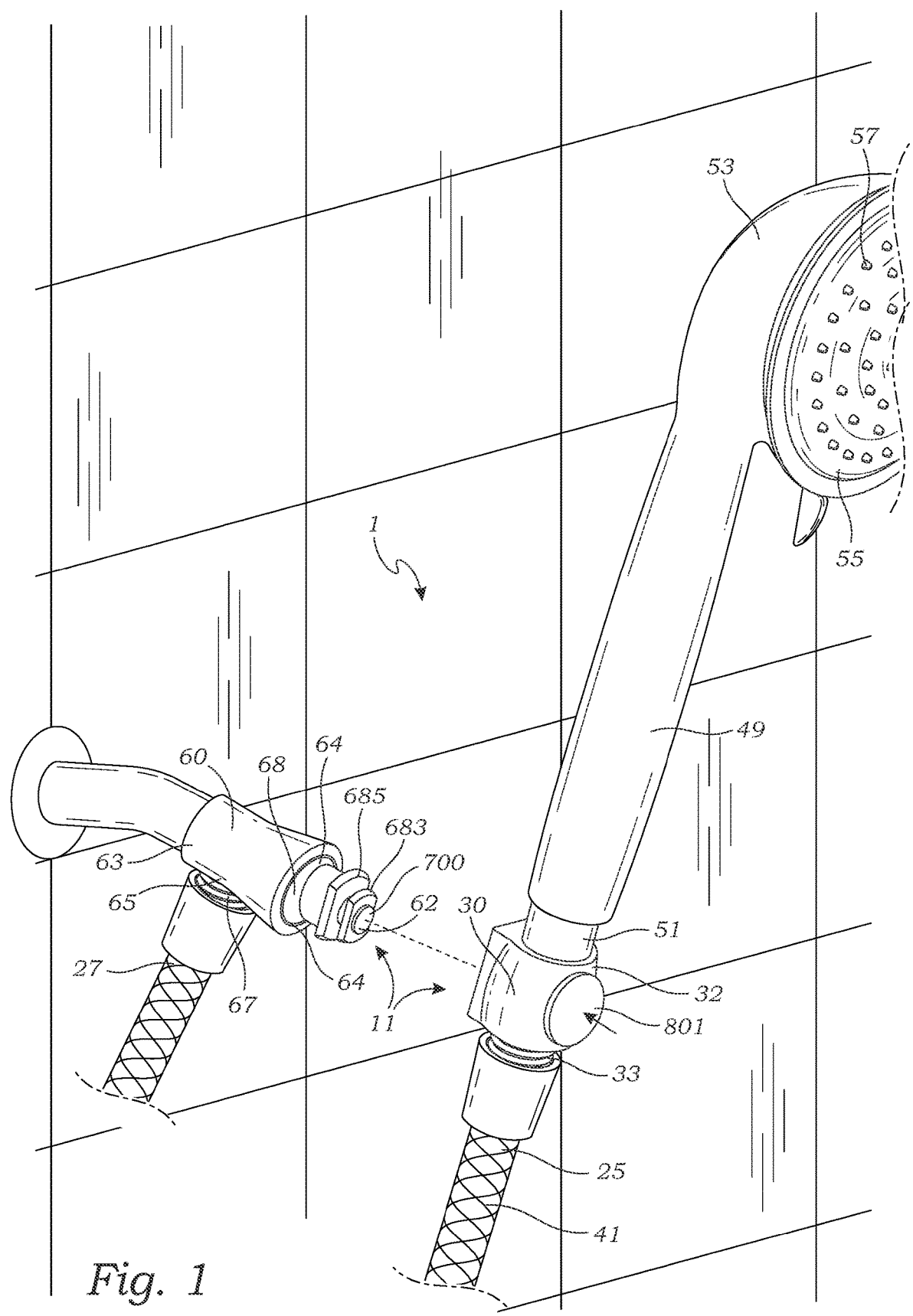
FIG. 1 is a front partially exploded view of a showerhead assembly having a handheld showerhead and an adapter assembly with a magnetic fastener.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to all FIGS. 1-22, the showerhead assembly 1 includes an adapter assembly 11 for supporting, and operatively engaging and disengaging a handheld showerhead 53 from a pipe of a water source. Specifically, the adapter assembly 11 comprises an adapter 30 and a diverter 60, which will be described in further detail below. The handheld showerhead portion of the showerhead assembly 1 has unique features but like traditional constructions includes a hollow handle 49 having a proximal end 51 which is operatively coupled to a flexible hose 41 having a first end 25 and a second end 27, and a distal end which includes a showerhead 53. Specifically, and unlike traditional handheld showerheads, the proximal end 51 is configured to releasably affix to the adapter 30. Moreover, the adapter 30 is coupled to and in fluid communication with the flexible hose 41, which is coupled to and in fluid communication with the diverter 60 that connects to the pipe of a water source.

The handle 49 includes a longitudinal axis, and preferably the showerhead 53 affixes to the distal end of the handle 49 at an angle, such as 45° to 90°, relative to the handle's 49 longitudinal axis. The showerhead assembly's handheld showerhead 53 has a front face 55 through which a plurality of nozzles 57 project. As understood by those skilled in the art, water is capable of flowing through a central channel within the center of the handle 49 which connects to the showerhead's nozzles 57 which are constructed to spray water. Specifically, water is transported from a central conduit in the diverter 60 to the flexible hose 41. More specifically, water travels from the hose 41 to a passageway 31 in the adapter 30 so as to pass through the central channel 401 within the handle 49 and, ultimately, expel from the nozzles 57 of the handheld showerhead 53.

In preferred embodiments, and with reference to FIGS. 1-22, the adapter 30 comprises a housing 32 which includes an inlet 33, an outlet 34, a front end 35, and a back end 36. In some embodiments, the housing 32 is generally cylindrical in shape. Various other adapter 30 shapes can be determined by those skilled in the art without departing from the scope of the disclosure.

Moreover, the adapter's inlet 33 is configured to connect to a water supply. Preferably, the inlet 33 includes female threads 37 for connecting to the male threads found at the first end 25 of the flexible hose 41. Further, the adapter's outlet 34 is configured to connect to the proximal end 51 of the handle 49. Preferably, the outlet 34 includes male threads 38 for threadably affixing to female threads found at the proximal end 51 of the handle 49. In preferred embodiments, the housing 32 further comprises the passageway 31 which extends between the inlet 33 and the outlet 34. In this regard, the inlet 33 is in fluid communication with the outlet 34. Specifically, water is transported from the flexible hose 41 into the adapter 30 by way of the inlet 33. More specifically, water is transported through the passageway 31 and exits the outlet 34 so as to travel through the handheld showerhead 53 for expellation therefrom.

The adapter assembly 11 can function as a portable mounting unit for releasably holding the handheld showerhead 53. Specifically, an attachment means is utilized for coupling the adapter 30 to the diverter 60. More specifically, in some embodiments, the adapter housing's back end 36 comprises an attachment means comprising a diverter engagement surface 709 for affixing to an adapter engagement surface on the diverter 60. In like manner, the diverter includes a complementary attachment means comprising the adapter engagement surface 683 for attaching to the adapter housing's back end 36. In some embodiments, the adapter housing's back end 36 comprises a cavity 39 which defines a space sized and configured to be complementary to a connection point 62 on the diverter 60. In this regard, the cavity 39 is configured to receive the connection point 62 and thereby engage with the diverter 60 so as to rotatably and releasably dock the attached handheld showerhead 53 by the connection point 62. Further, in this manner, the adapter engagement surface 683 defines the connection point 62 and the cavity 39 comprises the diverter engagement surface 709.

In preferred embodiments, the cavity 39 is a substantially spherical cavity. A "substantially spherical cavity" is defined as having a substantial portion of its surface as having a spherical or curved shape. However, "substantially spherical cavity" is intended to be interpreted broadly such that the entire cavity 39 need not have concave surface. For example, the substantially spherical cavity 39 can include a portion of the surface that is planar such as to form a frusto-spherical shape. Preferably, the cavity 39 is shaped such that it comprises a rounded or curved top edge 391 and a curved bottom edge 392, wherein the curved top edge 391 and the curved bottom edge 392 are positioned opposite of one another. More preferably, the cavity 39 is shaped such that it comprises a first flat edge 393 and a second flat edge 394, wherein the first flat edge 393 and the second flat edge 394 are positioned opposite of one another. Even more preferably, each flat edge 393, 394 is adjacent to each curved edge 391, 392, and each curved edge 391, 392 is adjacent to each flat edge 393, 394.

Further, in some preferred embodiments, the diverter 60 comprises a pipe end 63, a connection end 64, and a hose end 65. Specifically, the pipe end 63 is configured to connect to the pipe of the water source. In some embodiments, the pipe end 63 includes female threads 66 for connecting to male threads found at the end of a traditional shower stall pipe. Further, the hose end 65 is configured to connect with the second end 27 of the flexible hose 41. Preferably, the hose end 65 includes male threads 67 for connecting to the female threads found at the second end 27 of the flexible hose 41. In preferred embodiments, the diverter 60 further comprises the central conduit 601 (not shown) which extends from the pipe end 63 to the hose end 65. In this regard, water is able to be transported from the pipe of the water source through the flexible hose 41 so as to ultimately reach the handheld showerhead 53 for expellation therefrom.

In preferred embodiments, the connection end 64 comprises a coupling structure 68 for affixing to the adapter 30. In some embodiments, a proximal portion 681 of the coupling structure 68 is connected to the connection end 64 of the diverter 60 by a ball and socket attachment. In this regard, the coupling structure 68 is able to rotate or swivel about a central axis. Preferably, the coupling structure 68 comprises the connection point 62 which engages with the adapter 30. As such, when the adapter 30 is connected to the handheld showerhead 53 and is attached to the diverter 60 by the connection point 62, the user can manipulate the angle of the handheld showerhead 53 due to the ball and socket attachment realized by the coupling structure 68 and connection end 64. For example, the coupling structure 68 can swivel from side to side, so as to change the positioning of the handheld showerhead 53 coupled to the adapter 30 attached thereon, thereby altering the trajectory of the water spraying from the handheld showerhead's nozzles 57. Those of skill in the art will recognize that other coupling mechanisms can be utilized to connect the coupling structure 68 to the connection end 64 of the diverter 60 without departing from the scope of the disclosure.

Preferably, the coupling structure 68 has a distal portion 682 comprising the connection point 62 axially extending therefrom. Further, in some embodiments, the adapter engagement surface 683, which defines the connection point 62, is sized and configured to correspond to the shape of the cavity 39, which comprises the diverter engagement surface 709. In this regard, the adapter engagement surface 683 can include flat sides 684 which are complementary to the flat edges 393, 394 of the cavity 39 (e.g., FIG. 3). Due to the flat geometry of the adapter engagement surface 683 and cavity 39, the handheld showerhead 53 is able to be kept in an upright position upon engagement of the adapter engagement surface 683 with the cavity 39. In this regard, the coupling between the adapter 30 and diverter 60 is strengthened. Further, the handheld showerhead 53 is prevented from inadvertent rotation. Due to the ball and socket attachment of the coupling structure 68 to the connection end 64, however, the user can still intentionally rotate the handheld showerhead 53 to a desired position.

Figure 3:
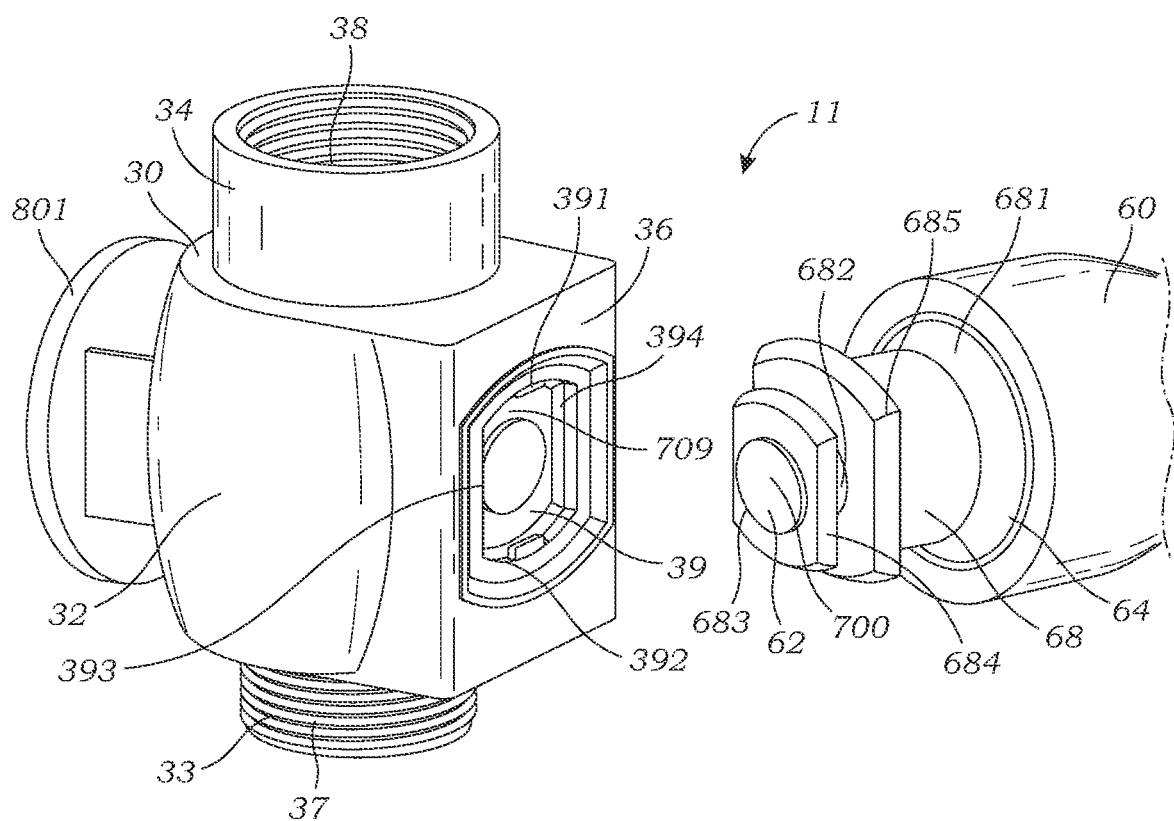
FIG. 3 is a partially exploded view of the adapter and the coupling structure of the showerhead assembly illustrated in FIG. 1, illustrating the connection point.
Figure 4:
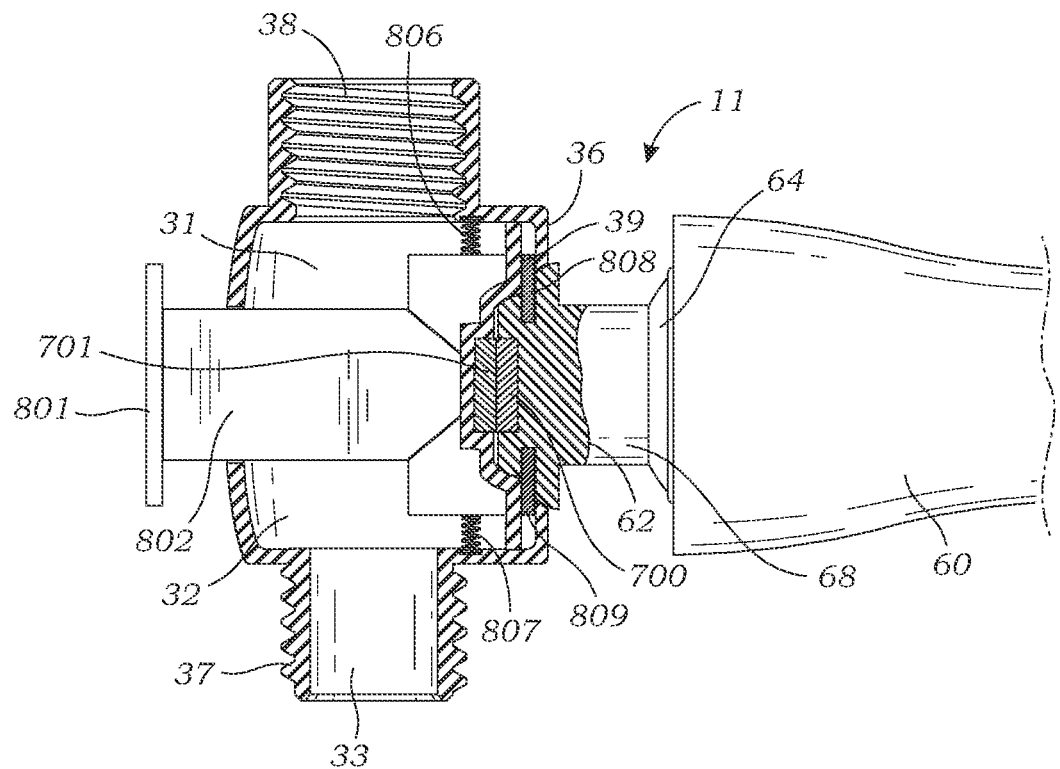
FIG. 4 is a left side cutaway view of the adapter and coupling structure of the showerhead assembly illustrated in FIG. 1, illustrating the adapter connected to the coupling structure.
Figure 5:
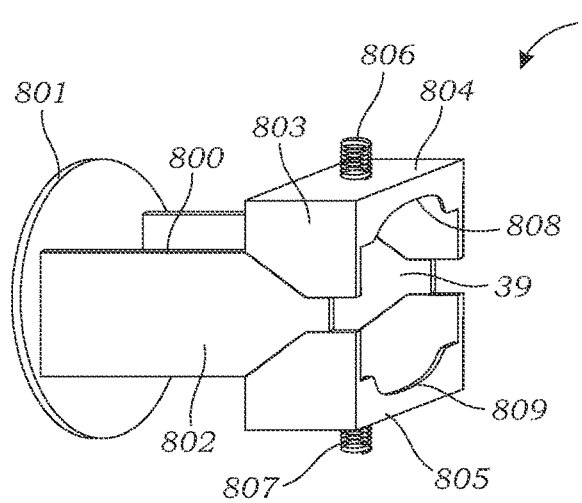
FIG. 5 is a left perspective view of the spring-loaded button and tab mechanism and body of the adapter illustrated in FIG. 1.
Figure 6:
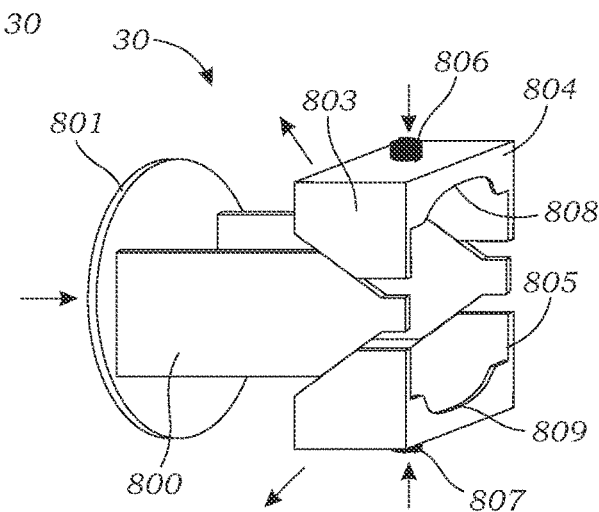
FIG. 6 is a left perspective view of the spring-loaded button and tab mechanism and body of the adapter illustrated in FIG. 1, illustrating the movement of the upper body portion and lower body portion in response to the tab moving in an inward direction relative to the body.
Figure 7:
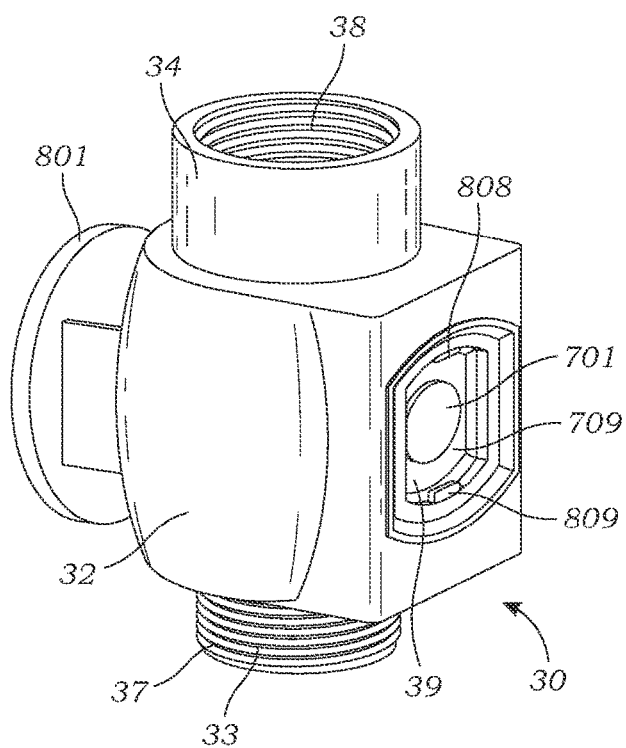
FIG. 7 is a left perspective view of the adapter illustrated in FIG. 1.
Figure 8:
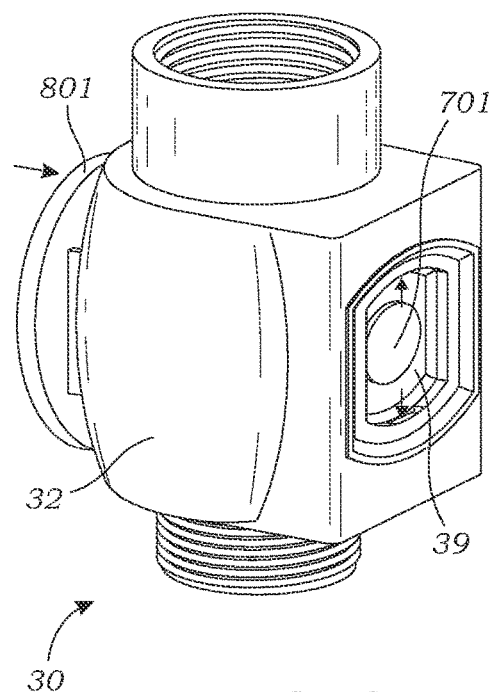
FIG. 8 is a perspective view of the adapter illustrated in FIG. 1, depicting the button being pressed and the upper clasp and lower clasp moving in the housing so as to no longer protrude from the cavity.
Figure 9:
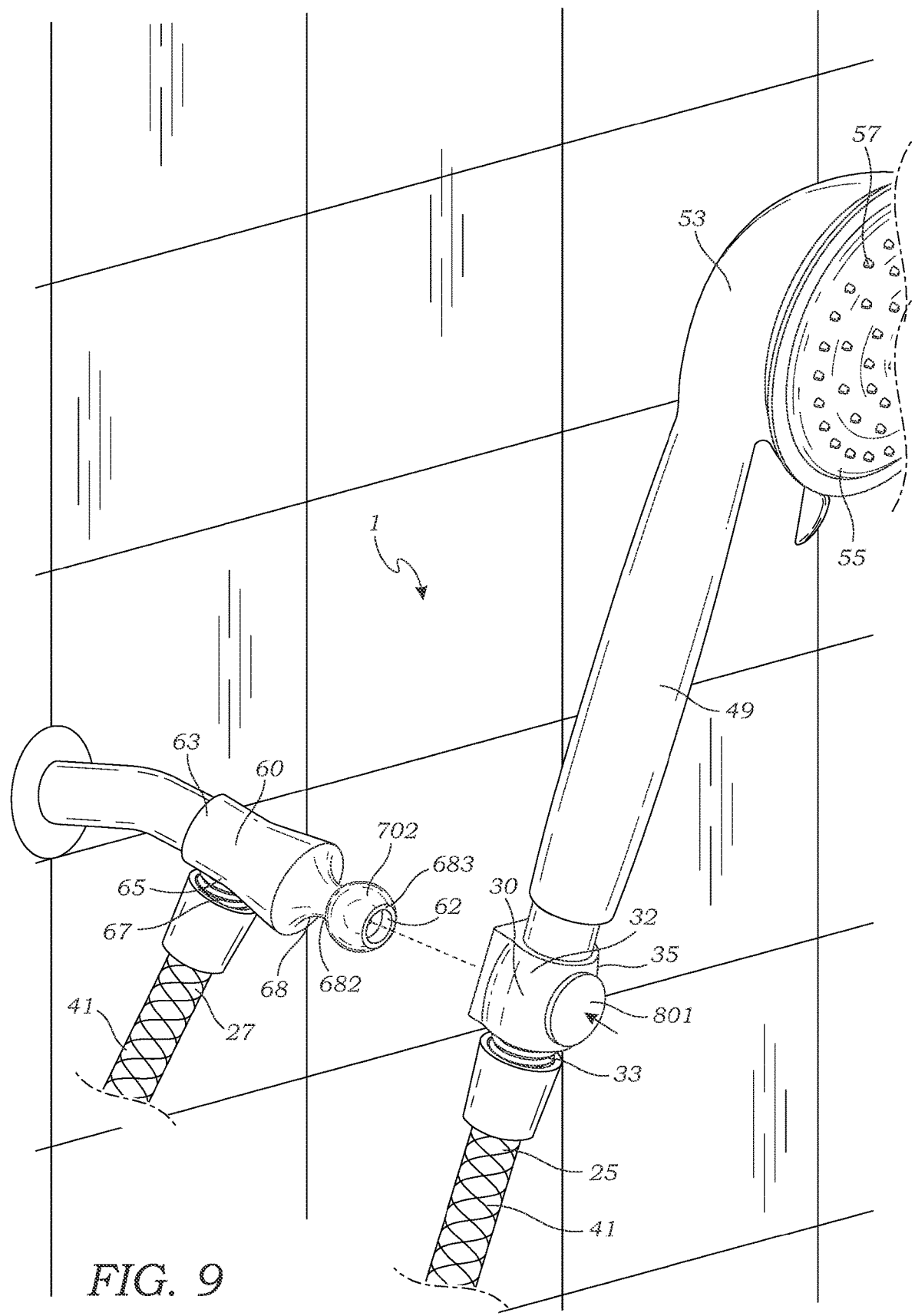
FIG. 9 is a front partially exploded view of a showerhead assembly having a handheld showerhead and an adapter assembly with a ball joint coupling mechanism.

In some preferred embodiments, and as best shown in FIGS. 1 and 3, the distal portion 682 of the coupling structure 68 further comprises an alignment surface 685. In some embodiments, the alignment surface 685 axially extends from the distal portion 682. Preferably, the alignment surface 685 has a larger surface area than the adapter engagement surface 683. More preferably, the alignment surface 685 can be the same shape as the adapter engagement surface 683. Even more preferably, the alignment surface 685 is sized and configured to be complementary to a portion of the cavity 39. In this regard, the alignment surface 685 functions to further stabilize and secure the connection realized between the coupling structure 68 and adapter 30. In some embodiments, an outer perimeter of the alignment surface 685 corresponds to a largest perimeter of the cavity 39 so as to further secure the connection realized between the adapter 30 and the coupling structure 68.

In some preferred embodiments, the adapter engagement surface 683 which defines connection point 62 includes an attachment mechanism, such as a magnetically attractable material or connector magnet 700. In these embodiments, and as best shown in FIGS. 1, 3, 4, 7, and 8, the cavity 39 which comprises the diverter engagement surface 709 includes a corresponding attachment mechanism, such as a magnetically attractable material complementary to the connector magnet or an adapter magnet 701. Preferably, the connector magnet 700 and adapter magnet 701 each produce a magnetic field and are attracted to one another. In this regard, the adapter 30 is coupled to the coupling structure 68 by attraction of the connector magnet 700 to the adapter magnet 701. In some embodiments, the connector magnet 700 is a magnetic disk 700 disposed on or protruding from the adapter engagement surface 683. In some embodiments, a complementary adapter magnet 701 (e.g., a magnetic disk 701) of the adapter 30, is disposed within the cavity 39 of the adapter 30. Specifically, the complementary adapter magnet 701 can be housed within the cavity 39 and protrude from a planar diverter engagement surface 709 therefrom.

In other preferred embodiments, and with reference to FIGS. 9-20, the coupling structure 68 defines a curved area by which a ball 702 extends therefrom. In these embodiments, the ball 702 comprises the adapter engagement surface 683 and defines the connection point 62 and attachment mechanism. Specifically, the ball 702 is sized and configured to releasably engage with the adapter's cavity 39. More specifically, in these embodiments, the cavity 39 defines a space correspondingly configured for receipt of the ball 702. Upon engagement of the cavity 39 with the ball 702, the adapter 30 coupled with the handheld showerhead 53 is thereby removably and rotatably engaged with the coupling structure 68 of the diverter 60.

Figure 19:
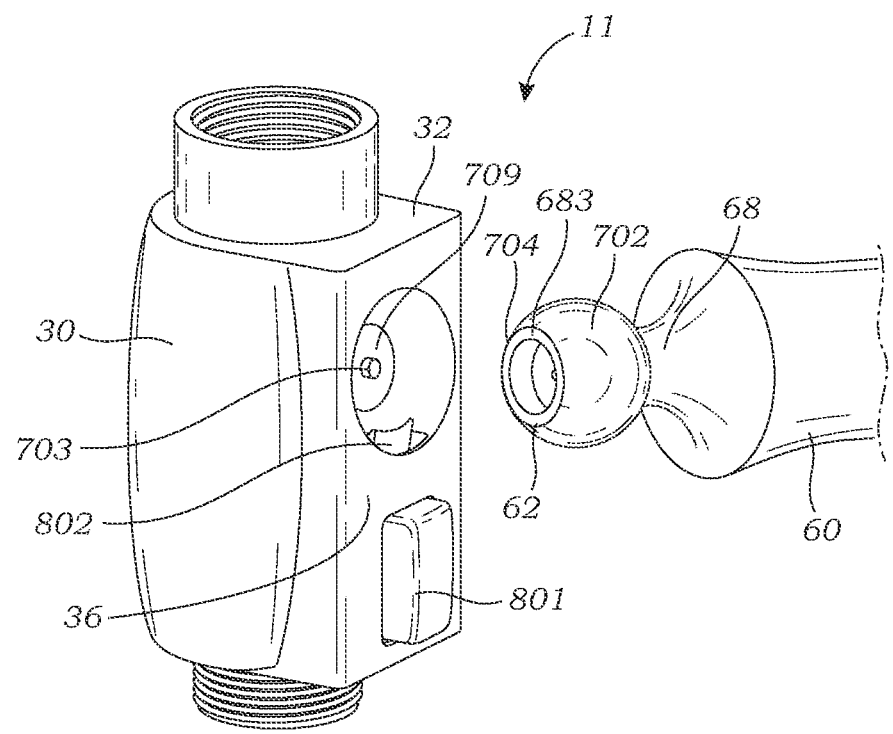
FIG. 19 is a partially exploded view of the adapter assembly illustrated in FIG. 17, illustrating the connection point.
Figure 20:
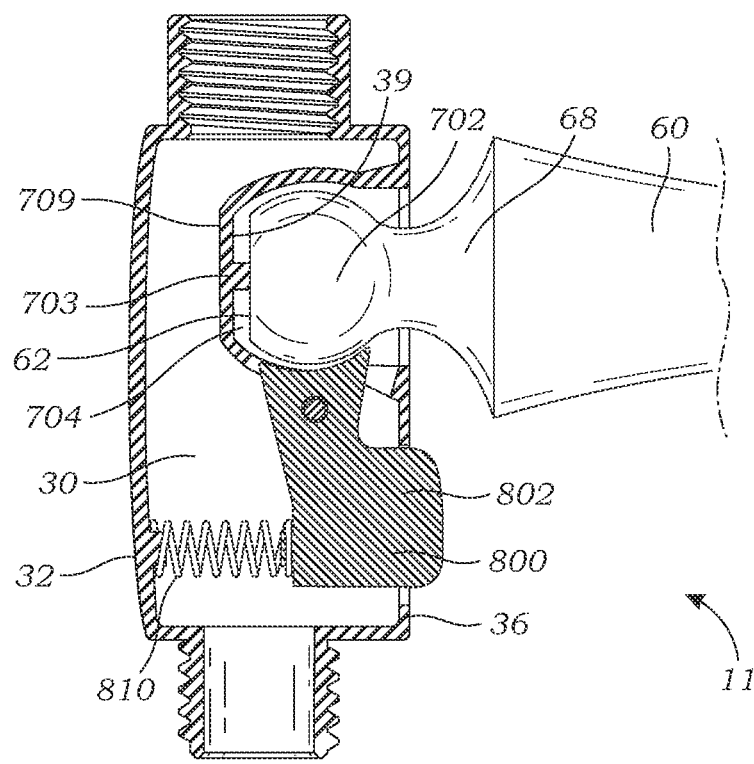
FIG. 20 is a left side cutaway view of the adapter assembly of the showerhead assembly illustrated in FIG. 17, illustrating the adapter connected to coupling structure and the spring-loaded button and tab mechanism.

Preferably, and as best illustrated in FIGS. 19-20, the cavity 39 can include a tension pin 703 which extends axially from the cavity's planar diverter engagement surface 709. Additionally, the tension pin 703 is sized and configured to engage with corresponding structures that reside on the ball 702 wherein it provides tension therebetween to help maintain the adapter 30 coupled with the showerhead handle 53 in a desired position by way of securely connecting the adapter 30 to the coupling structure 68. Though not shown, in some embodiments, the ball 702 has a distal end 704 being planar and comprising a preliminary alignment chamber and a second axially aligned smaller locking chamber. Preferably, the preliminary alignment chamber and locking chamber are both spherical in shape. Though not illustrated, the locking chamber can be sized and positioned to engage with the tension pin 703, wherein the engagement of the tension pin 703 with the locking chamber prevents over-rotation of the ball 702, or inadvertent release of the adapter 30 from the coupling structure 68. Moreover, the preliminary alignment chamber can be sized and positioned for receipt of the tension pin 703. The engagement of the tension pin 703 with the preliminary alignment chamber further stabilizes the connection realized between the adapter 30 and the coupling structure 68, and secures the ball 702 in place so as to prevent it from popping out of the cavity 39.

Figure 21:
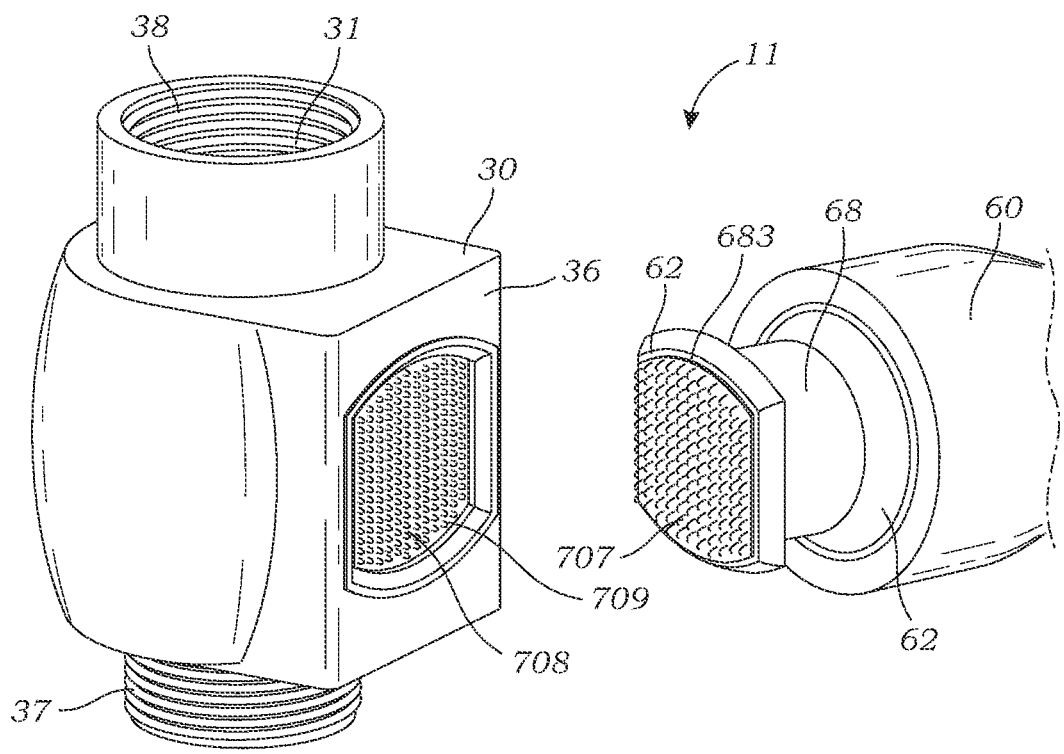
FIG. 21 is a partially exploded view of the adapter and coupling structure of a showerhead assembly, illustrating a hook and loop coupling mechanism.
Figure 22:
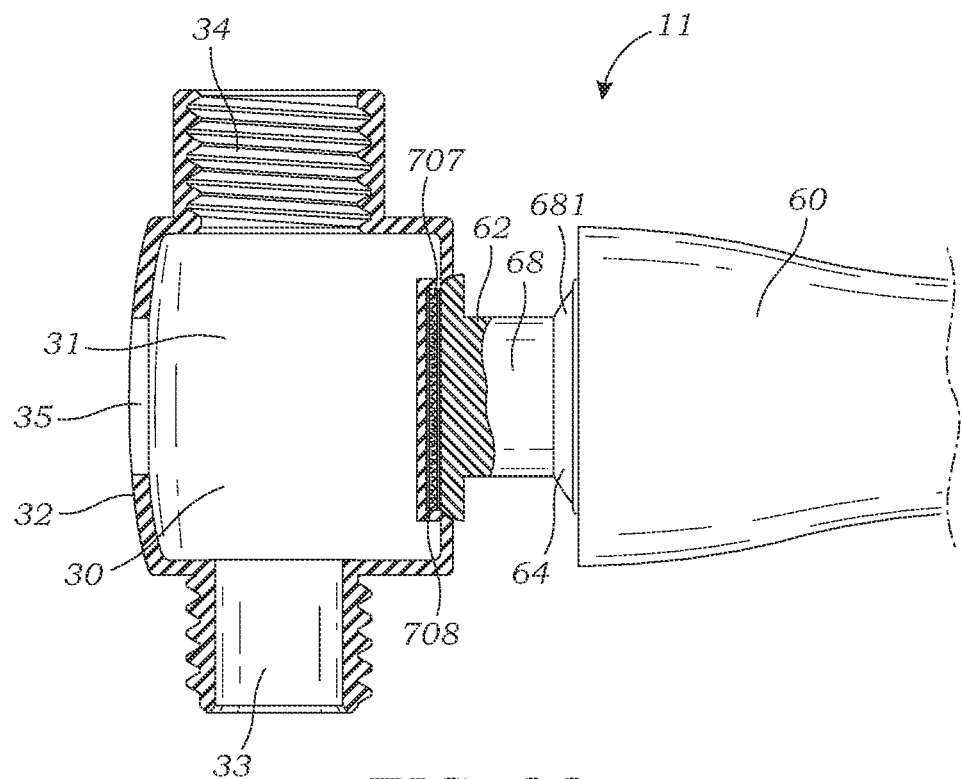
FIG. 22 is a left cutaway view of the adapter and coupling structure illustrated in FIG. 21, illustrating the adapter coupled with the coupling structure of the diverter by the hook and loop coupling mechanism.

Those of skill in the art will recognize that other fastener or attachment mechanisms can be utilized to connect the adapter 30 to the coupling structure 68 of the diverter 60 without departing form the scope of the disclosure. For example, in some embodiments, the coupling structure 68 can be connected to the adapter 30 by way of a hook and loop attachment mechanism. In these embodiments, and as shown in FIGS. 21-22, the connection point 62 of the coupling structure 68 can include one or more hook portions 707 and the cavity 39 can comprise one or more loop portions 708, or vice versa. Specifically, in these embodiments, the adapter engagement surface 683 and the diverter engagement surface 709 can each be covered with a particular attachment mechanism. For example, the hook portions 707 can be disposed on a portion or entirety of the adapter engagement surface 683 and the loop portions 708 can be disposed on a portion or entirety of the diverter engagement surface 709, or vice versa. In some embodiments, the coupling structure 68 can be connected to the adapter 30 by way of an adhesive, such as Velcro.

In preferred embodiments, and with reference to FIGS. 1-22, the adapter assembly 11 comprises a spring-loaded button and tab mechanism 800 which can further secure and stabilize the connection between the coupling structure 68 and adapter 30. Specifically, the adapter 30 can be secured on or released from the coupling structure 68 as a function of the spring-loaded button and tab mechanism 800.

Preferably, and as best illustrated in 1-20, the button 801 extends from the adapter. Specifically, and as shown in FIGS. 1-16, the button 801 can protrude from the front end 35 of the adapter 30. Those of skill in the art will appreciate that the button 801 can protrude from various other parts of the adapter assembly 11 without departing from the scope of the disclosure. For example, in some embodiments, and as shown in FIGS. 17-20, the button 801 can extend from the back end 36 of the adapter's housing 32, at a position distal relative to the cavity 39. In other embodiments, though not shown, the button 801 can be disposed on a portion of the diverter 60.

In preferred embodiments, the button 801 can be a lever. In some embodiments, the button 801 is coupled with and fits on the tab 802 which is connected to a body 803 of the cavity 39. Specifically, and as best shown in FIGS. 5-6, and 13-14, the body 803 can comprise an upper body portion 804 and a lower body portion 805. Even more specifically, and as best shown in FIGS. 5-8, and 13-16, the upper body portion 804 and the lower body portion 805 are configured to move between a contracted position and an expanded position in response to movement of the tab 802. In preferred embodiments, the tab 802 pivotally moves in an inward and outward trajectory relative to the body 803.

Additionally, and with particular reference to FIGS. 5-6, and 13-14, a first spring 806 interfaces with the upper body portion 804 and a second spring 807 interfaces with the lower body portion 805. Preferably, a bottom portion of the first spring 806 is affixed to the upper body portion 804, and an upper portion of the second spring 807 is affixed to the lower body portion 805. More preferably, the bottom portion of the first spring 806 is affixed to an upper surface of the upper body portion 804, and the upper portion of the second spring 807 is affixed to a bottom surface of the lower body portion 805. Even more preferably, as a force is exerted on the button 801 (e.g., an upward force is exerted on the lever 801 or the lever 801 is pressed inwardly), the tab 802 pivots in an inward direction towards the body 803, and the first spring 806 and second spring 807 are configured to compress. In this regard, as the springs 806, 807 compress, the upper body portion 804 can move in an upward direction and the lower body portion 805 can move in a downward direction away from a central axis of the body 803. In other words, the upper body portion 804 and lower body portion 805 move from the contracted position (as shown in, e.g., FIGS. 5, 7, 13, and 15) to the expanded position (as shown in, e.g., FIGS. 6, 8, 14, and 16) in response to the button 801 being pressed and the tab 802 moving inwardly.

Contrastingly, if an opposite force is exerted on the button 801 (e.g., if the lever 801 is released, if an outward force is exerted on the lever 801, or if the lever 801 is pulled downwardly), the tab 802 pivots in an outward direction away from the body 802. As such, the first spring 806 and second spring 807 are configured to decompress and the upper body portion 804 moves in a downward direction and lower body portion 805 moves in an upward direction, or in a direction towards the central axis of the body 803, so as to transition from the expanded position (FIGS. 6, 8, 14, and 16) to the contracted position (FIGS. 5, 7, 13, and 15).

Further, in preferred embodiments, and still with reference to FIGS. 5-8, AND 13-16, an upper clasp 808 extends from the upper body portion 804 and a lower clasp 809 extends from the lower body portion 805. Preferably, the upper clasp 808 and lower clasp 809 are configured such that they a protrude from the cavity 39 when the upper body portion 804 and the lower body portion 805 are in the contracted position. In this regard, the upper clasp 808 and lower clasp 809 extend from the cavity 39 so as to grip the coupling structure 68 by its connection point 62 and secure the connection realized therebetween. In the expanded position, the upper body portion 804 moves in an upward trajectory and the lower body portion 805 moves in a downward trajectory such that the upper clasp 808 and lower clasp 809 are entirely disposed within the housing 32 and no longer protruding from the cavity 39. As such, the adapter 30 can be released or removed from the coupling structure 68.

In other preferred embodiments, and with reference to FIGS. 19-20, the tab 802 pivotally moves in an upward and downward trajectory and is situated directly adjacent to and underneath the cavity 39. Additionally, a spring 810 is disposed within the housing 32 of the adapter 30 and is arranged so as to reside between the button 801/tab 802 and the adapter 30. Furthermore, the spring 810 is configured so as to compress and decompress as a function of the button 801 and tab 802 mechanism. Moreover, the tab's 802 pivotal movement is dependent on and controlled by the button 801 and thereby, the state of compression of the spring 810.

Specifically, when the button 801 is not pressed, the spring 810 remains in a decompressed state and the tab 802 extends upwards so as secure the connection point 62 within the cavity 39. For example, the tab 802 can extend upwards to encapsulate the ball 702 received in the cavity 39 and thereby provide integral support for the connection experienced therebetween. Conversely, upon depression of the button 801, the spring 810 compresses and the tab 802 pivots downwardly. In this state, the tab 802 is no longer protruding upwards so as to secure the connection between the adapter 30 and the coupling structure 68 by its connection point 62. For example, when the tab 802 is no longer protruding upwards, it no longer encapsulates and provide support for the ball 702 received in the cavity 39. Various spring-loaded button and tab constructions for providing these capabilities can be selected by those skilled in the art.

Figure 2:
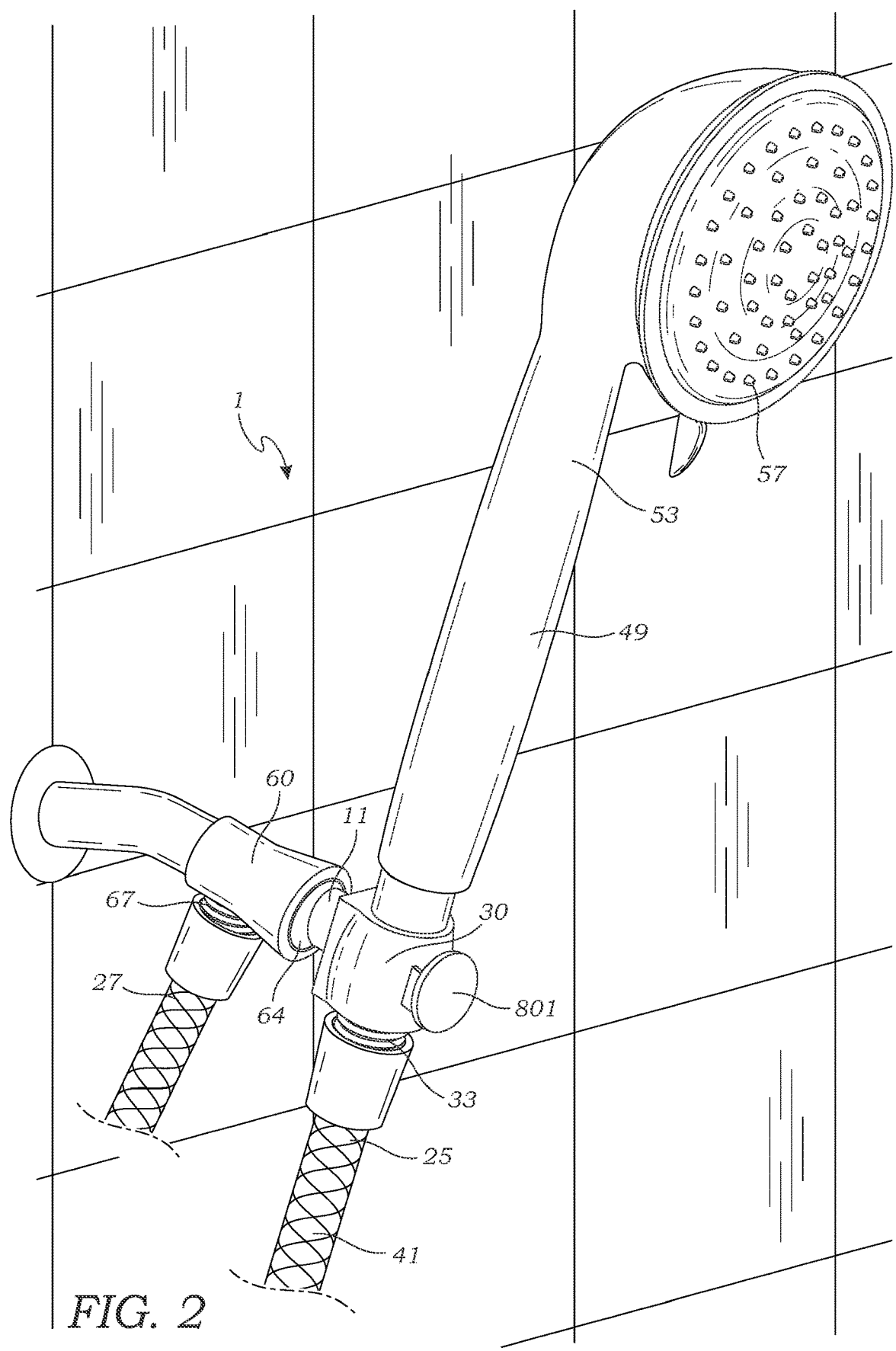
FIG. 2 is a front view of the showerhead assembly illustrated in FIG. 1, illustrating the adapter coupled to the coupling structure of the diverter.
Figure 10:
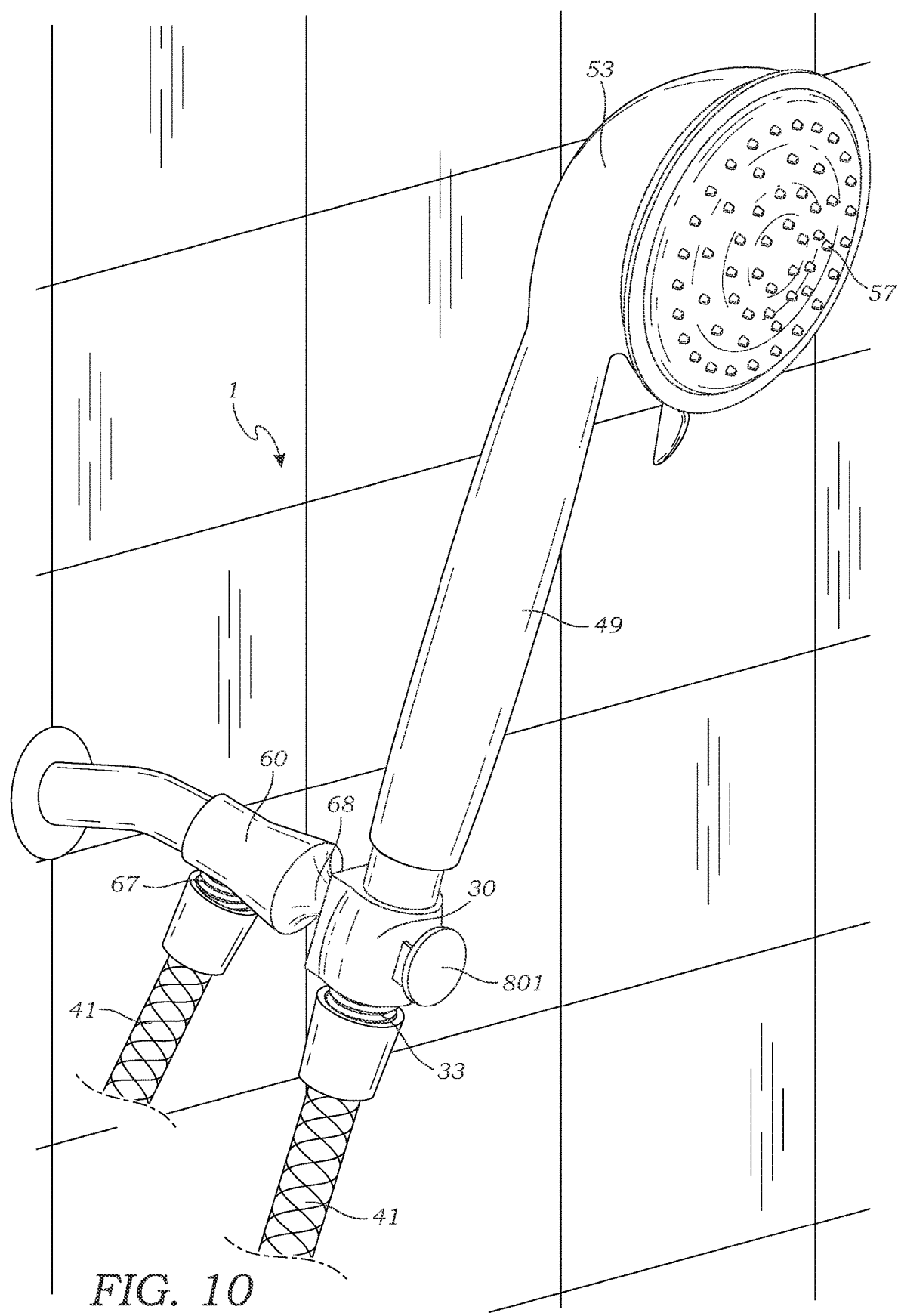
FIG. 10 is a front view of the showerhead assembly illustrated in FIG. 9, illustrating the adapter coupled to the coupling structure of the diverter.
Figure 11:
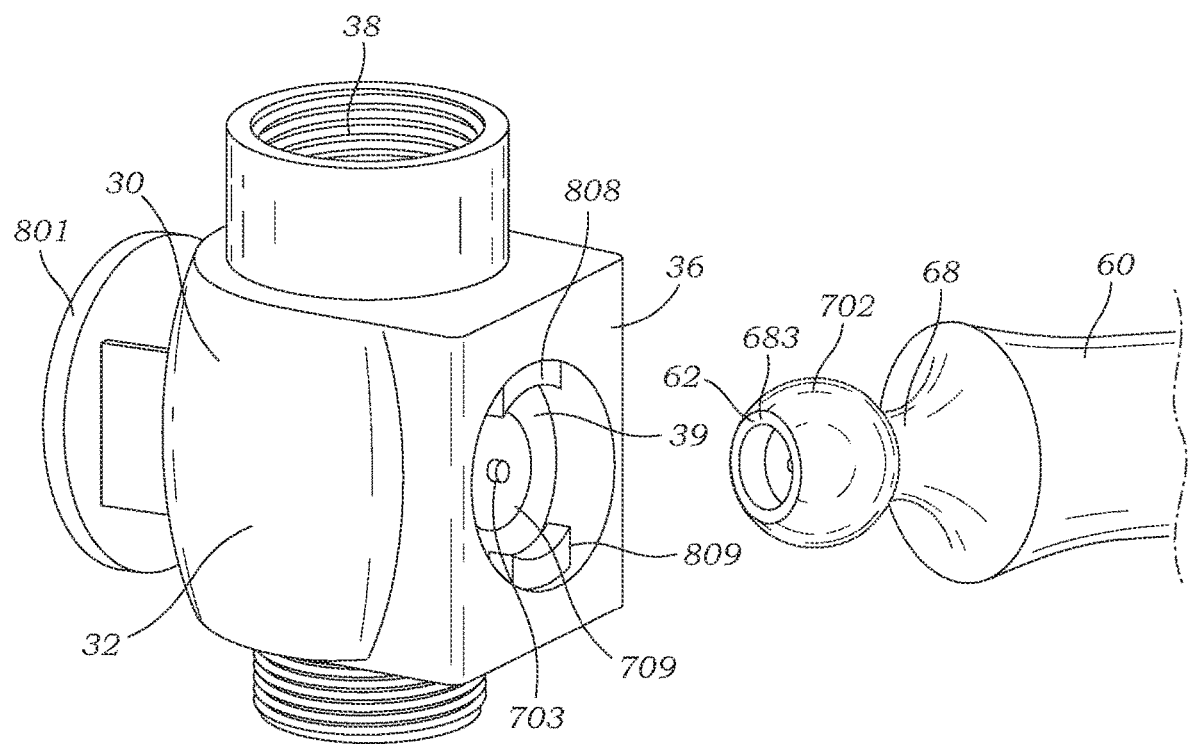
FIG. 11 is a partially exploded view of the adapter and coupling structure of the showerhead assembly illustrated in FIG. 9, illustrating the connection point.
Figure 12:
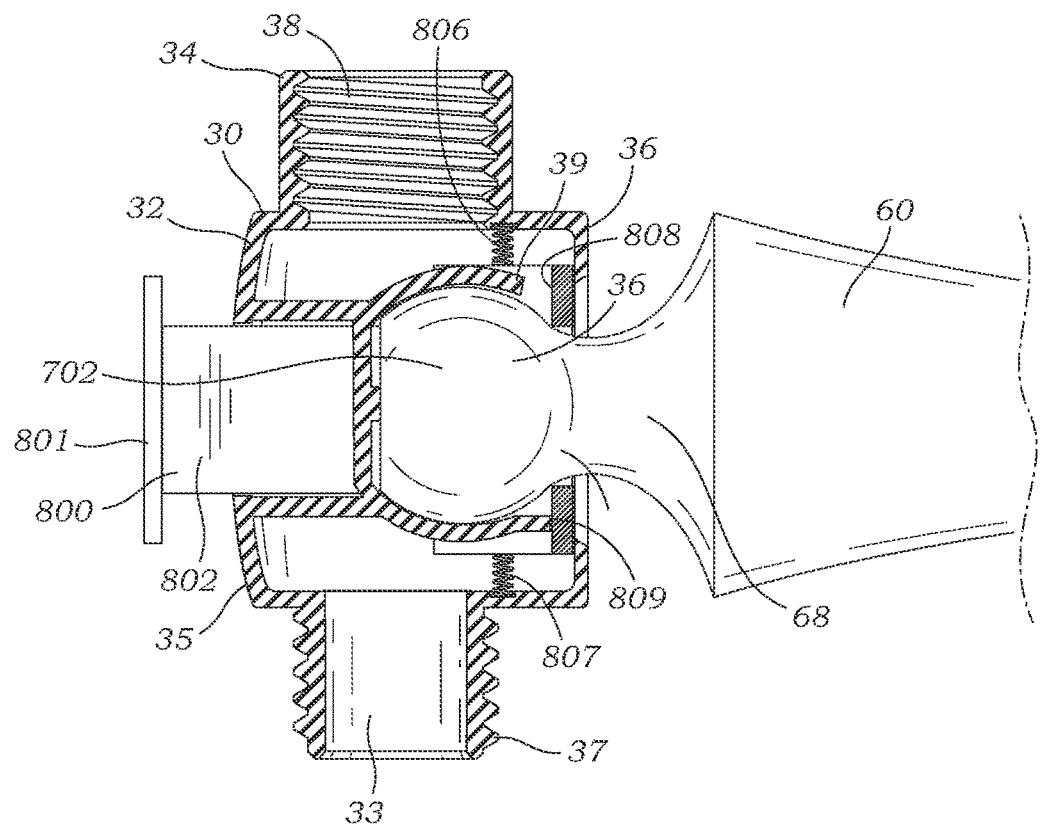
FIG. 12 is a left side cutaway view of the adapter and coupling structure of the showerhead assembly illustrated in FIG. 9, illustrating the adapter connected to the coupling structure.
Figure 13:
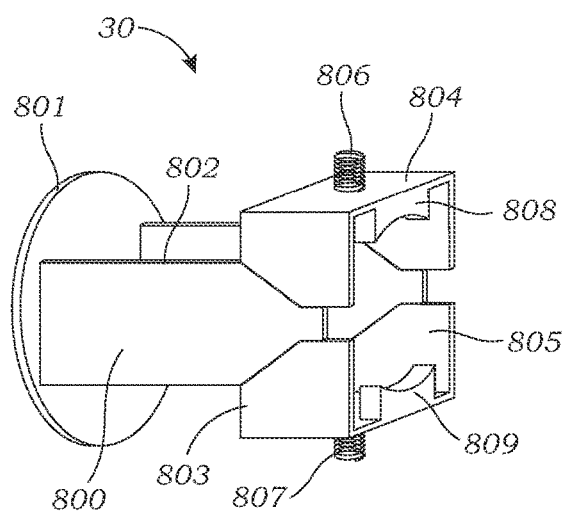
FIG. 13 is a left perspective view of the spring-loaded button and tab mechanism and body of the adapter illustrated in FIG. 9.
Figure 14:
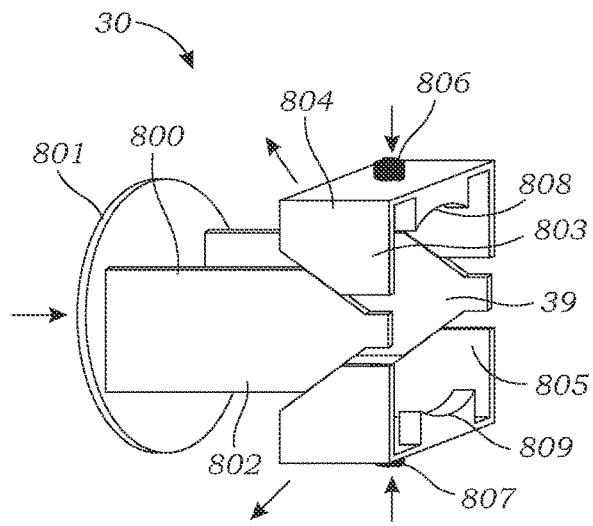
FIG. 14 is a left perspective view of the spring-loaded button and tab mechanism and body of the adapter illustrated in FIG. 19, illustrating the movement of the upper body portion and lower body portion in response to the tab moving in an inward direction relative to the body.
Figure 15:
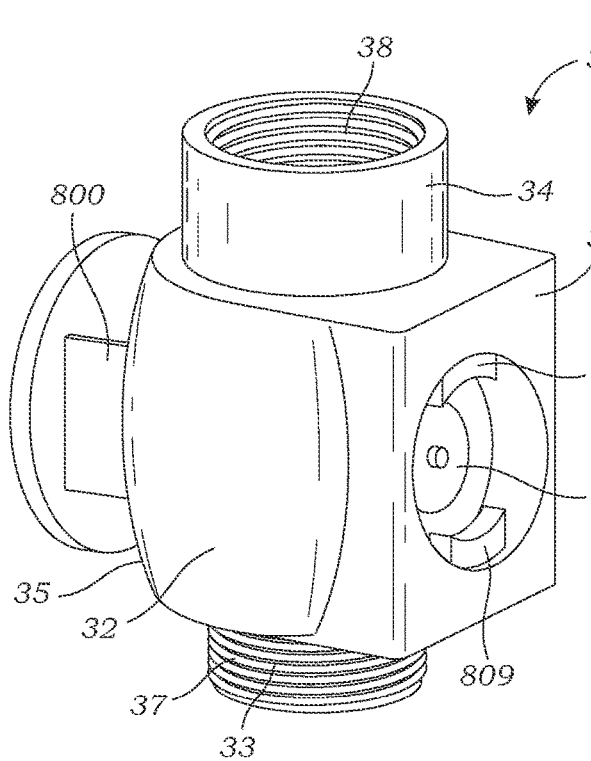
FIG. 15 is a left perspective view of the adapter illustrated in FIG. 9.
Figure 16:
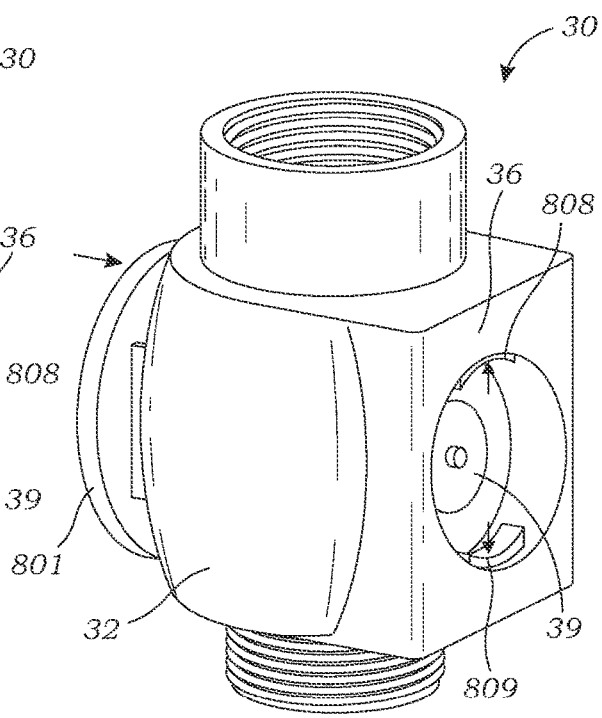
FIG. 16 is a perspective view of the adapter illustrated in FIG. 9, depicting the button being pressed, and the upper clasp and lower clasp moving in the housing so as to no longer protrude from the cavity.
Figure 17:
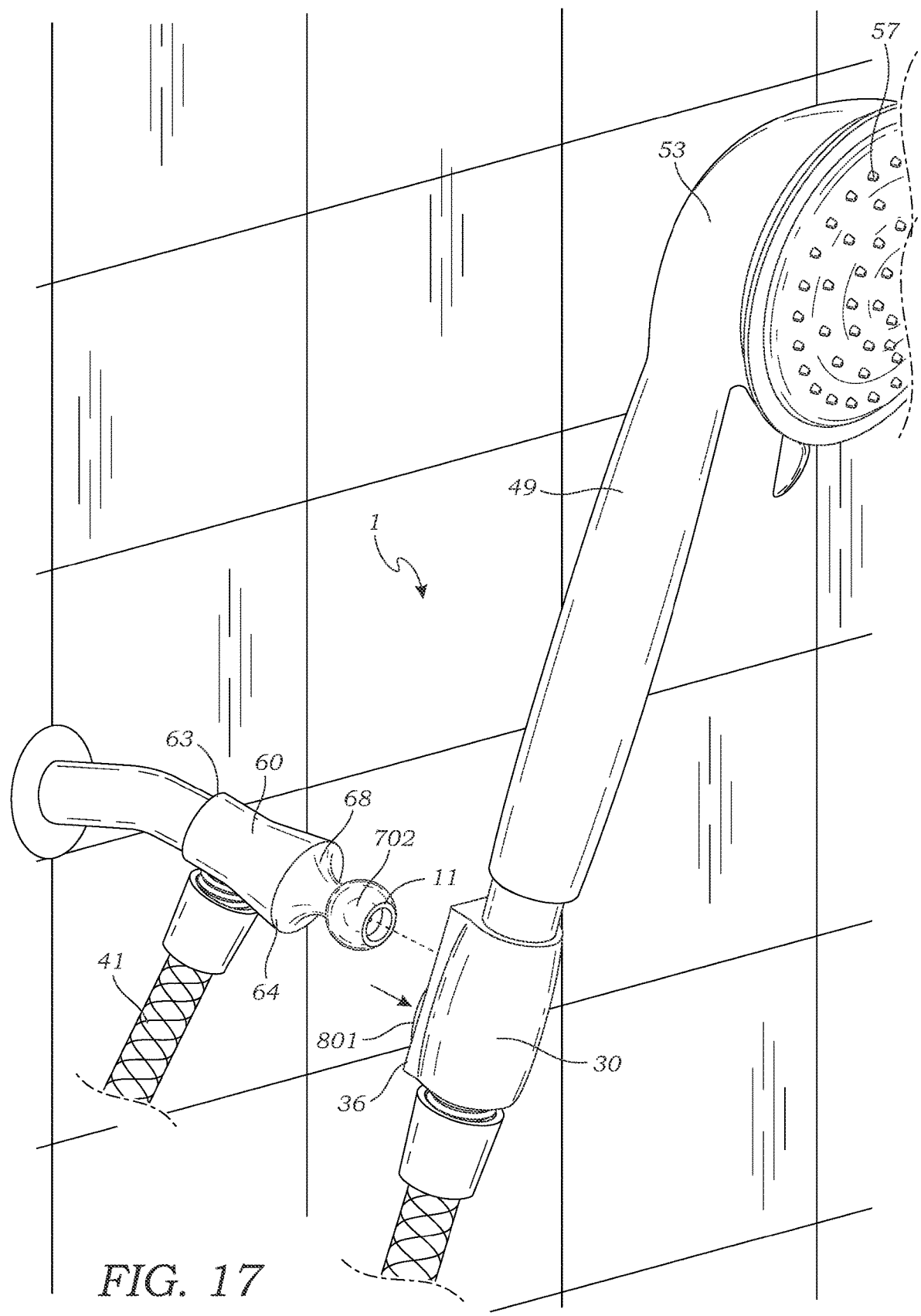
FIG. 17 is a front partially exploded view of a showerhead assembly having a handheld showerhead and an adapter assembly with a ball joint coupling mechanism and a button on the back end of the adapter.
Figure 18:
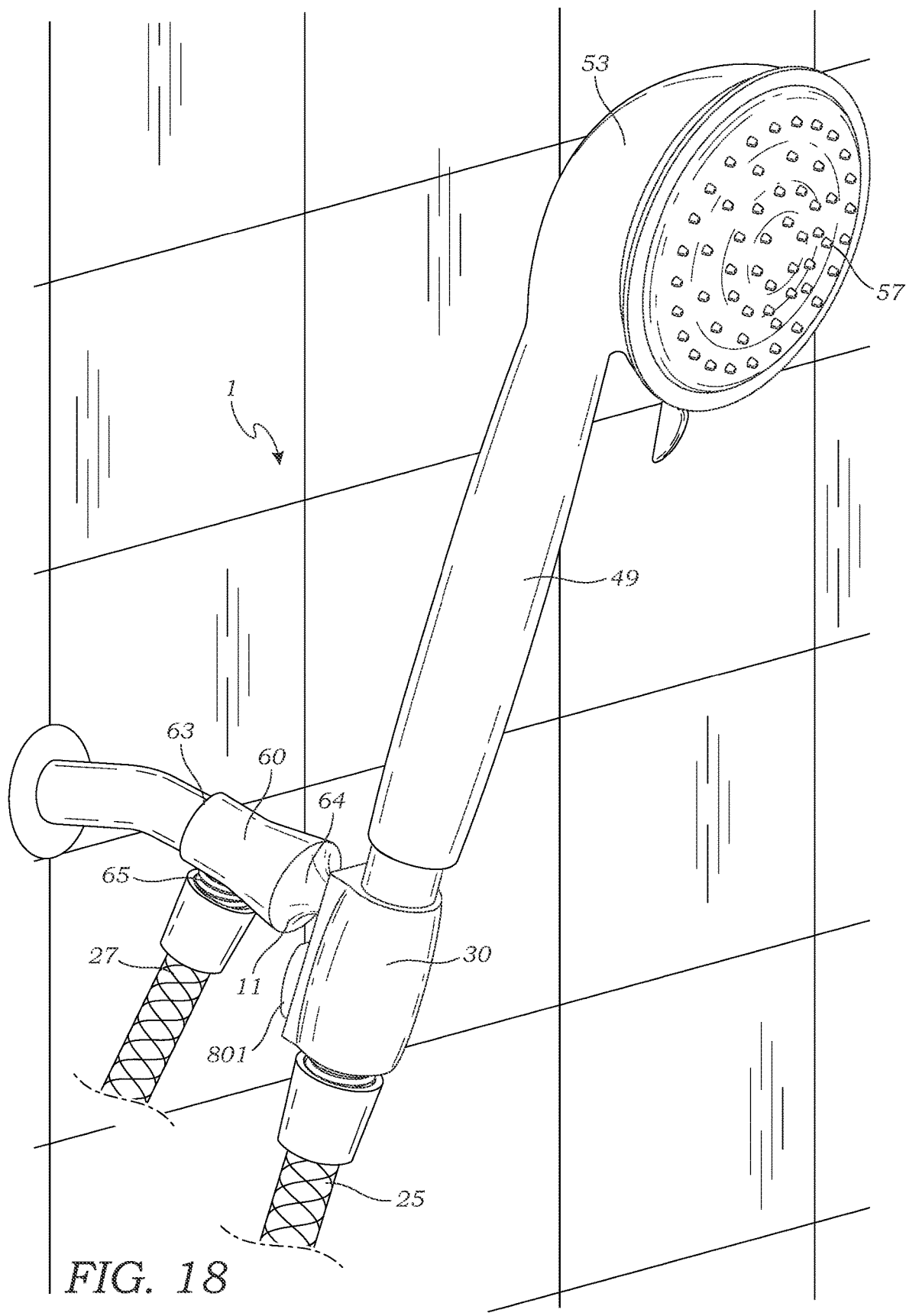
FIG. 18 is a front view of the showerhead assembly illustrated in FIG. 17, illustrating the adapter coupled to the coupling structure of the diverter.

Accordingly, as best illustrated in FIGS. 2, 10, and 18, once the handheld showerhead 53 is properly engaged with the adapter 30, and the adapter 30 is connected with the coupling structure 68 of the diverter 60, the handheld showerhead 53 is securely and rotatably engaged with the adapter assembly 11. In this regard, and due to the ball and socket mechanism of the coupling structure 68 and connection end 62, the handheld showerhead 53 is capable of pivoting in different directions, so as to be able to spray water throughout a shower stall, as desired by the bather.

The present shower assembly provides an adapter assembly 11 for holding a handheld shower assembly 1. Advantageously, the adapter assembly 11 provides an attachment means to engage and disengage the handheld showerhead 53 from the coupling structure of the diverter 60 connected to the pipe of the water source. Also advantageously, the ball and socket connection allows the bather to orient the handheld showerhead 53 as desired so as to divert the stream of water to different locations within the shower enclosure.

While preferred showerhead assemblies have been illustrated and described, it will be apparent that various modifications can be made without departing from the spirit and scope of the invention. Alternative embodiments may be envisioned by those skilled in the art after consideration of the present disclosure. Accordingly, it will be apparent that various modifications can be made without departing from the spirit and scope of the invention.

It will be understood by those of skill in the art that any of the showerhead assemblies described herein, are meant to be illustrative only, and that the individual elements, or any combination of elements, depicted and/or described for a particular embodiment or figure are freely combinable with any other element, or any combination of other elements, depicted and/or described with respect to any of the other embodiments.

Accordingly, it is not intended that the invention be limited except by the following claims. Having described my invention in such terms to enable a person skilled in the art to understand the invention, recreate the invention, and practice it, and having identified the presently preferred embodiments thereof, I claim:

The invention claimed is:

1. An adapter assembly for a handheld showerhead, the assembly comprising:
   a diverter which includes female threads for affixing to male threads of a pipe of a water source and male threads for affixing to female threads of a flexible hose;
   an adapter which includes female threads for affixing to male threads at a first end of a flexible hose, and wherein said adapter comprises male threads for affixing to female threads at a proximal end of a handle of said handheld showerhead; and
   an attachment means for attaching said adapter to said diverter, wherein said attachment means includes an adapter engagement surface formed on said diverter and a diverter engagement surface formed on said adapter, and wherein said diverter engagement surface is complementary to said adapter engagement surface and is configured to couple said adapter to said diverter; and
   said diverter further includes a connection end comprising a coupling structure for engaging with said adapter, wherein said adapter engagement surface is disposed on said coupling structure, and wherein said diverter engagement surface is disposed on said adapter.

2. The assembly of claim 1, wherein said diverter further includes a pipe end comprising said female threads of said diverter, wherein said diverter further includes a hose end comprising said male threads of said diverter, wherein said hose end is in fluid communication with said pipe end.

3. The assembly of claim 1, wherein said adapter further includes a housing comprising an inlet, an outlet, a front end and a back end.

4. The assembly of claim 3, wherein said inlet comprises said female threads of said adapter, wherein said outlet comprises said male threads of said adapter, wherein said housing further comprises a passageway extending from said inlet to said outlet for transporting water received in said adapter to said handheld showerhead for expellation from a plurality of nozzles projecting therefrom.

5. The assembly of claim 1, wherein said adapter engagement surface defines a connection point that affixes to said adapter, wherein said adapter comprises a housing with a cavity comprising said diverter engagement surface, and wherein said adapter engagement surface is sized and configured to correspond to a shape of said cavity.

6. The assembly of claim 1, wherein said adapter engagement surface includes one or more flat sides, wherein said adapter comprises a cavity which includes one or more flat edges complementary to said one or more flat sides, wherein each of said one or more flat sides is configured to engage with a complementary one of said one or more flat edges to secure engagement of said adapter with a said coupling structure of said diverter.

7. The assembly of claim 1, wherein said coupling structure includes an alignment surface sized and configured to be complementary to a portion of said cavity, wherein said alignment surface interfaces with said portion of said cavity and is configured to secure engagement between said adapter and said coupling structure.

8. The assembly of claim 1, wherein said diverter engagement surface comprises a first magnetic disk on said adapter, wherein said adapter engagement surface comprises a second magnetic disk on said diverter, wherein said first magnetic disk is magnetically attracted to said second magnetic disk.

9. The assembly of claim 8, wherein said adapter comprises a housing with a cavity, wherein said first magnetic disk is housed within said cavity and protrudes from said diverter engagement surface that is planar, and wherein said second magnetic disk is configured to protrude from said adapter engagement surface.

10. The assembly of claim 1, further comprising a spring-loaded button and tab mechanism with a first spring and a second spring, said button extends from said adapter, wherein said adapter comprises a housing with a cavity having a body, wherein said body comprises an upper body portion and a lower body portion, wherein said upper body portion comprises said first spring and said lower body portion comprises said second spring, wherein said upper body portions and said lower body portion are configured to transition between a contracted position and an expanded position in respond to movement of said tab.

11. The assembly of claim 10, wherein in said contracted position, an upper clasp and a lower clasp are configured to protrude from said cavity and grip said coupling structure on said diverter to secure engagement of said diverter with said adapter, and wherein in said expanded position, said upper clasp and said lower clasp are disposed entirely within said housing and said adapter can be disengaged from said diverter.

12. A handheld showerhead assembly comprising:
a handheld showerhead comprising a hollow handle, a front face and a plurality of nozzles projecting from said front face, said hollow handle comprising a proximal end and a distal end with said distal end affixed to said handheld showerhead, said handheld showerhead further comprising a channel connecting said hollow handle's proximal end to said nozzles for transporting water received from said handle's proximal end to said nozzles;
a hose having a first end and a second end;
an adapter assembly comprising an adapter and a diverter, said adapter configured to releasably couple with said handheld showerhead, said adapter comprising a housing with an inlet, an outlet, a front end, and a back end, said outlet in fluid communication with said first end of said flexible hose and said inlet in fluid communication with said handle's proximal end, said housing comprising a passageway extending from said inlet to said outlet for transporting water received in said adapter to said handheld showerhead for expellation from said nozzles,
wherein said diverter comprises a pipe end configured to connect to a pipe of a water source, a hose end in fluid communication with said pipe end and configured to connect with a second end of said flexible hose, and a connection end comprising a coupling structure with a connection point configured to engage with a cavity of said adapter, wherein said adapter comprises a diverter engagement surface and said cavity comprises a complementary adapter engagement surface configured to couple said adapter to said diverter.

13. The handheld showerhead assembly of claim 12, wherein said adapter engagement surface includes one or more flat sides, wherein said cavity includes one or more flat edges complementary to said one or more flat sides, wherein each of said one or more flat sides is configured to engage with a complementary one of said one or more flat edges to secure engagement of said adapter with said coupling structure.

14. The handheld showerhead assembly of claim 12, wherein said diverter engagement surface comprises a first magnetic disk on said adapter, wherein said adapter engagement surface comprises a second magnetic disk on said diverter, wherein said first magnetic disk is magnetically attracted to said second magnetic disk.

15. The handheld showerhead assembly of claim 14, wherein said adapter comprises a housing with a cavity, wherein said first magnetic disk is housed within said cavity and protrudes from said diverter engagement surface that is planar, and wherein said second magnetic disk is configured to protrude from said adapter engagement surface.

16. The handheld showerhead assembly of claim 12, further comprising a spring-loaded button and tab mechanism with a first spring and a second spring, said button extends from said adapter, wherein said adapter comprises a housing with a cavity having a body, wherein said body comprises an upper body portion and a lower body portion, wherein said upper body portion comprises said first spring and said lower body portion comprises said second spring, wherein said upper body portions and said lower body portion are configured to transition between a contracted position and an expanded position in respond to movement of said tab.

17. The handheld showerhead assembly of claim 16, wherein in said contracted position, an upper clasp and a lower clasp are configured to protrude from said cavity and grip a coupling structure on said diverter to secure engagement of said diverter with said adapter, and wherein in said expanded position, said upper clasp and said lower clasp are disposed entirely within said housing and said adapter can be disengaged from said diverter.

\* \* \* \* \*